United States Patent
Schweiss et al.

(10) Patent No.: US 12,293,854 B2
(45) Date of Patent: May 6, 2025

(54) ELECTRODE MATERIAL

(71) Applicant: SGL CARBON SE, Wiesbaden (DE)

(72) Inventors: Rüdiger-Bernd Schweiss, Meitingen (DE); Christian Meiser, Meitingen (DE); Dana Cazimir, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 0 days.

(21) Appl. No.: 18/250,634

(22) PCT Filed: Oct. 26, 2021

(86) PCT No.: PCT/EP2021/079620
§ 371 (c)(1),
(2) Date: Apr. 26, 2023

(87) PCT Pub. No.: WO2022/090196
PCT Pub. Date: May 5, 2022

(65) Prior Publication Data
US 2023/0395279 A1    Dec. 7, 2023

(30) Foreign Application Priority Data

Oct. 26, 2020  (DE) .................... 10 2020 213 461.8

(51) Int. Cl.
*H01B 1/04*  (2006.01)
*H01B 13/00*  (2006.01)
(52) U.S. Cl.
CPC .......... *H01B 1/04* (2013.01); *H01B 13/0016* (2013.01)

(58) Field of Classification Search
CPC ...................................................... H01M 4/96
See application file for complete search history.

(56) References Cited

U.S. PATENT DOCUMENTS

| 7,144,476 B2 | 12/2006 | Wilde et al. |
| 2003/0161781 A1 | 8/2003 | Cabasso et al. |
| 2019/0006682 A1 | 1/2019 | Okano et al. |

FOREIGN PATENT DOCUMENTS

| DE | 3307090 A1 | 9/1984 |
| DE | 10151134 B4 | 7/2012 |
| EP | 1502992 A1 | 2/2005 |
| EP | 1328947 B1 | 12/2006 |
| EP | 2089925 B1 | 10/2014 |
| JP | 2007268735 A | 10/2007 |
| JP | 6041430 B2 | 12/2016 |
| KR | 20200031845 A * | 3/2020 ............. D21H 13/50 |

OTHER PUBLICATIONS

International Search Report issued on Feb. 10, 2022, in corresponding International Patent Application No. PCT/EP2021/079620, 4 pages.
German Office Action issued on May 19, 2021, in corresponding Patent Application No. 10 2020 213 461.8, 9 pages.

* cited by examiner

*Primary Examiner* — Khanh T Nguyen
(74) *Attorney, Agent, or Firm* — Maier & Maier, PLLC

(57) ABSTRACT

A method for producing an electrode material for gas diffusion layers, to the electrode material thereby produced and to its use.

15 Claims, 2 Drawing Sheets

ELECTRODE MATERIAL

FIELD

The present invention relates to a method for producing an electrode material for gas diffusion layers, to the electrode material thereby produced and to its use.

BACKGROUND

Gas diffusion layers (GDLs) are highly porous, conductive materials based on carbon or metals and are used primarily in polymer electrolyte fuel cells (PEMFCs), metal-air batteries, electrochemical reactors and electrolyzers. GDLs which additionally contain electrocatalytically active constituents are referred to as gas diffusion electrodes (GDEs).

The core task of the GDL is to supply the electrochemically active layers with gaseous or liquid fuels (hydrogen, methanol) and with oxidants (oxygen) and to dissipate current and heat or remove reaction products. Carbon-based GDLs generally have a macroporous electrode material comprising carbon fibers, which is hydrophobized with fluoropolymers and is provided on one side with a microporous layer (MPL) of carbon particles and fluoropolymers (generally polytetrafluoroethylene, PTFE). The MPL penetrates partly into the macroporous electrode material.

The macroporous electrode materials are produced either by weaving carbon fibers or by nonwoven processes (dry or wet-laying nonwoven technology). Current GDLs are based almost exclusively on nonwovens made of carbon fibers, while the fabric only plays a subordinate role.

To produce GDL electrode materials, either a primary nonwoven made of carbon fibers and binders is produced or a primary nonwoven made of carbon fiber precursors is produced and this nonwoven is subsequently carbonized. In industrial practice, substantially the following two different methods are used for producing primary nonwovens:

A) Dry laying nonwovens from precursor fibers:
Here, nonwovens are produced from crimped staple fibers made of polyacrylonitrile (PAN) or of oxidized polyacrylonitrile having a typical fiber titer of 0.8 to 4 dtex and a fiber length of 30 to 70 mm using hydroentanglement (spunlace technology). These nonwovens are then further carbonized to give carbon fiber nonwovens, wherein prior thermal stabilization takes place when PAN is used as the precursor fiber. The carbonization causes approximately 10 to 15% shrinkage of the nonwoven.

B) Wet nonwoven technology (paper production) with short cut carbon fibers
Here short-cut carbon fibers made of polyacrylonitrile (PAN) having a typical fiber length of 3 to 15 mm are dispersed and processed by means of an inclined wire paper machine with the aid of binder fibers or aqueous dispersions of binder polymers to form nonwovens. This is followed optionally by impregnation with carbonizable resins and curing of the resin matrix with subsequent carbonization.

EP1328947B1 describes a process based on method A with crimped, preoxidized polyacrylonitrile staple fibers having a length of 40 to 80 mm with the addition of polyvinyl alcohol-based binder fibers. The latter flow due to the influence of temperature and moisture (hydroentanglement). Said primary nonwovens are compacted by means of a calendering machine and subsequently carbonized.

Routes according to method B are based on short-cut carbon fibers having a length of 6 to 12 mm, which are processed by means of thermoplastic binders to form a paper. Said primary nonwovens ("papers") generally have a low grammage (<30 g/m$^2$) and are mechanically less stable. They are impregnated with carbonizable resins, for example phenolic resins, and carbonized again to improve the electrical and thermal conductivity and to increase the strength (US71444476B2).

EP1502992A1 describes a method based on method B (paper process) with short-cut carbon fibers and using fibrillated or ground polyacrylonitrile fibers as binding substance. The latter are metered into the fibrous stock suspension. After the formation of the nonwoven fabric, the web is compressed under the influence of heat by means of double belt presses.

The production method according to EP 2089925B1 uses dry or wet laying processes in which the binder is introduced, inter alia, in the form of unhardened phenolic resin fibers (for example Novoloid® (uncured phenolic resin fibers)). An electrode material is obtained by thermal cross-linking under the influence of pressure with subsequent carbonization.

Fuel cells for automotive use require increasingly thinner gas diffusion layers (<200 µm) due to the limited construction space and the high current densities with high demands placed on thickness tolerances and homogeneity. This is because this fuel cell stack consists of up to 400 individual cells, and problems relating to uniform compression and stack dimensions can thus occur in the case of relatively high thickness variations of the GDL (compared to the remaining components).

A disadvantage of the method B is that, especially in the case of carbon fiber papers, impregnation processes are needed after the paper production process which require additional process steps and cost factors. This relates in particular to the outlay for dispersing and drying and the longer process cycles. In addition, the impregnation processes could sometimes lead to inhomogeneities if the impregnation with fillers or binder resins is not effected uniformly. Furthermore, classic production methods without compaction of the impregnated material do not allow the production of thin substrates with sufficient mechanical stability since the fiber volume fraction is too low. A high fiber content or a low binder content is desired since, in fuel cell operation, water can preferably accumulate at the binder matrix, which is detrimental since it reduces the performance of the cell.

SUMMARY

The object of the present invention is therefore to provide an alternative method for producing an electrode material for gas diffusion layers having reduced thickness, which method prevents the disadvantages of additional process steps and thus costs.

According to the invention, this object was achieved by providing a method for producing an electrode material for gas diffusion layers, comprising the following steps:
 a) providing at least one layer of fibrous structure,
 b) providing at least one layer of thermoplastic material,
 c) stacking the at least one layer of fibrous structure from step a) with the at least one layer of thermoplastic material from step b)
 d) joining the stacked layers of step c) by applying a pressure of 2 to 80 bar and a temperature of 70 to 280° C. to a composite material, and e) carbonizing the composite material from step d) at temperatures of 1400 to 2500° C. in a protective gas atmosphere.

The advantage of the method according to the invention is that impregnation steps of the fibrous structure are unnecessary in the further production of the electrode material, so that a simpler and more cost-effective method is provided. This is because, due to the formation of a composite made of at least one layer of fibrous structure and at least one layer of thermoplastic material, by joining the layers under the influence of temperature and pressure to form a composite material, the thermoplastic material penetrates the fibrous structure and impregnation thus becomes superfluous. Furthermore, the thermoplastic material is furnished with carbonizable resins and/or carbon-based fillers, whereby the porosity of the carbonized material can be adjusted. Moreover, the described electrode material is more stable and has a higher fiber volume content. The method according to the invention can be carried out both as a continuous or batch process. In a continuous process (roll-to-roll method), sheets of fibrous structure and thermoplastic materials are used. In contrast, sheet goods are used in the batch process. The continuous process is preferred since process times are reduced in this way. The stacking of the layers described in step c) can take place in any sequence, with no limit being placed on the number of layers. However, two and three layers are preferred. The composite is obtained due to the influence of heat and pressure in step d), which by means of double-punch presses, laminating systems, double belt presses or calendering. Any protective gas, such as argon or nitrogen, can be used for the protective gas used in step e).

Within the scope of the invention, fibrous structures are understood to mean nonwovens of short fibers or staple fibers, wherein fiber fabrics also rank among the fibrous structures. Short fibers have a length of 1 mm-20 mm and staple fibers a length of 30-80 mm. Fabrics are textile fabrics, wherein the latter have at least two thread systems which do not run parallel and thus intersect. A nonwoven is understood to mean a structure made of short fibers or staple fibers which are produced by wet laying or dry laying.

In an advantageous embodiment, the at least one layer of fibrous structure from step a) is a carbon fiber nonwoven or a carbon fiber fabric. The carbon fiber nonwovens can be obtained by various methods, such as meltblown, spunlace or wet laying methods.

In an advantageous embodiment, the at least one layer of the fibrous structure has a thickness of 50 µm to 400 µm, preferably 100 µm to 250 µm. When less than 50 µm thick, the fibrous structure is too unstable, so that handling becomes more difficult, and when the fibrous structure is thicker than 400 µm, compaction is made more difficult. The thickness range from 100 µm to 200 µm is preferred, since here the ratio of stability and compression capability is particularly favorable.

According to the invention, the at least one layer of thermoplastic material from step b) is selected from the group of polyethylene (low-density polyethylene (LDPE), high-density polyethylene (HDPE)), polypropylene (PP), ethylene-vinyl acetate copolymers (EVA), polyvinyl butyral (PVB), cellulose acetate (CA), polyvinyl alcohol (PVA), vinylpyrrolidone-vinyl acetate copolymers, styrene-maleic anhydride copolymers (styrene-maleic anhydride (SMA)) or thermoplastic elastomers (thermoplastic polyolefins (TPO), styrene block copolymers (TPS)), preferably polyvinyl butyral, cellulose acetate or polyvinyl alcohol. Preferred are polymers with hydroxyl or anhydride groups since these condensation reactions are incorporated by resins or are themselves capable of crosslinking reactions.

The thermoplastic material is advantageously formed as a film or textile structure. Film and textile structures are preferred since the material is a sheet-like material so that the method can be carried out as a continuous process.

Advantageously, the thermoplastic material has a thickness of 10 µm to 300 µm, preferably of 20 µm to 75 µm. Thermoplastic material having a thickness of less than 10 µm is commercially unavailable, and thicker than 300 µm reduces the stability of the substrate and compaction is impaired. The range 50 µm to 250 µm is preferred since it results in a preferred ratio of fibrous structure to thermoplastic material. In a further advantageous embodiment, the at least one layer of thermoplastic material is coated with carbonizable resins and/or carbon materials. The coating results in the carbon yield being increased because the carbonizable resins convert to carbon during carbonization. The resins and carbon materials may be in the form of powders, suspensions, dispersions or solutions. Suspensions, dispersions or solutions can be applied by dip coating, spraying, screen printing, squeegees, curtain coating, roller application, prepreg technology or inkjet printing. Powdered substances can be applied by scattering. The mechanical properties of the electrode material can be controlled by means of the coating, and the coating also contributes to an impregnation step not being necessary in the further production of the electrode material.

Advantageously, the resins are selected from the group of phenolic resins, melamine resins, resorcinol resins, cyanate ester resins, vinyl ester resins Said resins have a particularly high carbon yield.

The carbon materials are advantageously selected from the group of molasses, bitumen, graphite, carbon black, activated carbon, ground carbon fibers, coal tar pitch or coke particles.

In a further advantageous embodiment, the coating comprises crosslinking additives (1-5% based on the proportion of thermoplastic material). The crosslinking additives increase the carbon yield of the thermoplastic components, and an electrode material having improved stability and conductivity is thereby obtained.

Advantageously, the crosslinking additives are selected from the group of organic peroxides, dialdehydes, diamines or UV curable polymers. Said crosslinking additives have a particularly high carbon yield.

In a further advantageous embodiment, the composite in step d) is additionally irradiated with ionizing radiation or UV radiation.

As a result, the carbon yield can be increased, which produces a higher conductivity of the electrode material.

A further subject matter of the present invention is an electrode material which has been produced by the method according to the invention.

The advantage of the electrode material is that it has a particularly smooth surface so that contact resistances within the cell are reduced. Furthermore, the high fiber volume of the electrode material means, on the one hand, that the water accumulation is significantly reduced so that the cell has a higher output and, on the other hand, that the thermal and electrical conductivity is increased, which likewise leads to higher conduction of the cell. The higher fiber volume content additionally brings about a higher stiffness or a higher shear modulus of the material. This results in less intrusion of the electrode material into the flow channels of the bipolar plate in the cell. This has the advantage that contact resistances are in turn reduced and less liquid water enrichment takes place in the flow channels of the bipolar plates.

According to a preferred embodiment, the electrode material has a thickness of 50 µm to 500 µm, preferably of 70 µm to 200 µm. According to yet another preferred embodiment, the electrode material has a density of 0.1 g/cm$^3$ to 0.6 g/cm$^3$, preferably 0.15 g/cm$^3$ to 0.40 g/cm$^3$. The selected thicknesses of the electrode material cause the desired stability and the selected densities of the electrode material ensure a pore space that is important for the GDL.

Yet another subject matter of the present invention is the use of the electrode material in polymer electrolyte fuel cells, in phosphoric acid fuel cells, microbial fuel cells, electrochemical reactors, oxygen consumption catalysts, metal-air batteries, PEM electrolyzers or batteries.

BRIEF DESCRIPTION OF THE FIGURES

The present invention is described below purely by way of example with reference to advantageous embodiments and with reference to the accompanying drawings.

FIG. 1 shows the method according to the invention. First, a thermoplastic film (1) is coated with a dispersion (2) and thus a film web with a coating (4) is obtained. Two film webs with coating (4) are combined with a carbon fiber nonwoven (6) to form a composite (9) by means of a plurality of heated calendering machines or belt presses (7,8). In a subsequent step, the composite (9) is subsequently carbonized in a continuous furnace (10) in a protective gas atmosphere to form an electrode material (11).

FIG. 2 additionally shows the crosslinking of the thermoplastic polymer by ionizing radiation or UV radiation (12).

FIG. 3 shows a coated thermoplastic material (4) according to the invention, wherein the coating (5) is applied to the thermoplastic material (1).

FIG. 4 shows a two-layer electrode material according to the invention, wherein the coating (5) of the thermoplastic material (1) abuts against the layer of carbon fiber nonwoven (6).

FIG. 5 shows a three-layer electrode material according to the invention, wherein the layer sequence is thermoplastic material (1) with a coating (5), carbon fiber nonwoven (6), thermoplastic material (1) with a coating (5), and the coating (5) abuts against the carbon fiber nonwoven (6) in each case.

FIG. 6 shows a three-layer electrode material according to the invention, wherein the layer sequence is carbon fiber nonwoven (6), thermoplastic material with coating (5), carbon fiber nonwoven (6).

DETAILED DESCRIPTION

Figure 1:
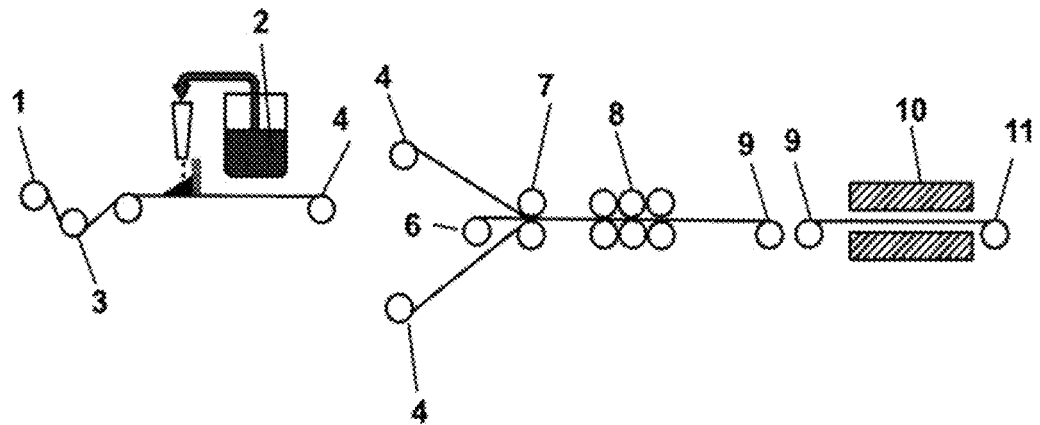
FIG. 1 shows the method according to the invention
Figure 2:
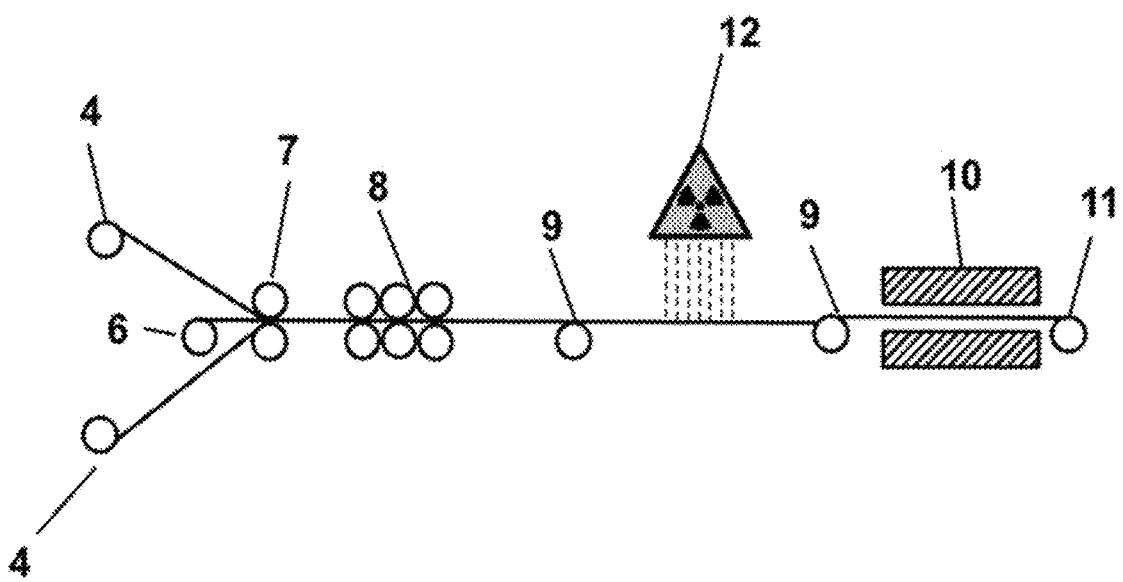
FIG. 2 shows the method according to the invention
Figure 3:
FIG. 3 shows a thermoplastic material with coating
Figure 4:
FIG. 4 shows a substrate having two layers
Figure 5:
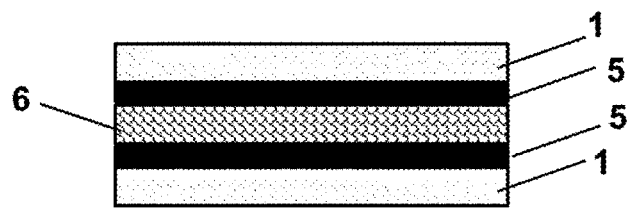
FIG. 5 shows a substrate having three layers
Figure 6:
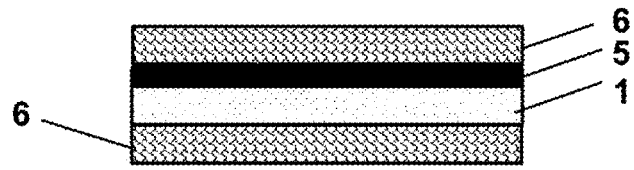
FIG. 6: shows a substrate having three layers

The present invention is explained below with reference to exemplary embodiments, wherein the exemplary embodiments do not constitute a limitation of the invention.

The production of a prosthesis component can take place as described below.

Exemplary Embodiment 1

1.5 parts Novolak phenolic resin (Bakelit, Hexion) and 1 part synthetic graphite (d50=4 µm) are dissolved or suspended in 1.5 parts ethanol. Said viscous dispersion is coated onto a polyvinyl butyral film (Trosifol®, Kuraray, 50 µm) (wet film thickness 40 µm) using squeegee methods. Subsequently, a composite of two layers of the coated polyvinyl butyral film and a carbon fiber nonwoven (23 g/m$^2$) is produced by means of a hot press (160° C., 5 bar) (layer sequence: Film I Carbon fiber nonwoven I Film). This composite is subsequently carbonized in a protective gas atmosphere at a temperature of 1400° C.

Exemplary Embodiment 2

150 g Novolak phenolic resin (Bakelit PF0227 SP, Hexion), 100 g ground carbon fibers (Sigrafil® CM80, SGL Carbon) and 100 g phenol-modified indene coumarone resin (Novar CA80, Rütgers) are dissolved or suspended in 150 g acetone. Said viscous dispersion is coated onto a polyvinyl butyral film (Trosifol®, Kuraray, 50 µm) (wet film thickness 50 µm) using squeegee methods. Subsequently, a composite of two layers of the coated polyvinyl butyral film and a carbon fiber nonwoven (23 g/m$^2$) is produced by means of a hot press (layer sequence Film I Carbon fiber nonwoven I Film). This composite is subsequently carbonized in a protective gas atmosphere at a temperature of 1400° C.

Exemplary Embodiment 3

A polyurethane film (HDPE, 50 µm, Folienwerk Lahr) is coated with a dispersion of phenolic resin (10 parts), acetylene black (5 parts) in isopropanol (18.5 parts) on a desk-coater and dried at 80° C. The application amount was 10 g/m$^2$. A composite consisting of a layer of carbon fiber structure (23 g/m$^2$) is produced between two layers of the coated film using a hot calendering machine (180° C., 10 bar), wherein the coating is oriented in each case to the carbon fiber structure. This is followed by carbonization at 1700° C. in a protective gas atmosphere.

Exemplary Embodiment 4

By means of a continuous press (140° C., 5 bar), a layer of carbon fiber nonwoven (18 g/m$^2$) is laminated and on both sides with a film based on ethylene-vinyl acetate copolymer (TecWeb®, 20) in each case. This is followed by electron irradiation (dose 150 Gy) to crosslink the polymer. The composite is subsequently carbonized in a protective gas atmosphere at a temperature of 1750° C.

The following table shows a summary of the exemplary embodiments.

| No. | Type | Top layers (4) | Middle layer (5) | Electron irradiation (11) | Carbonization (9) |
|---|---|---|---|---|---|
| 1 | A | PVB film/ Phenolic resin/ Graphite | Carbon fiber nonwoven | None | 1400° C. |
| 2 | A | PVB film/ Phenolic resin/C ground fiber | Carbon fiber nonwoven | None | 1400° C. |
| 3 | A | HDPE/ Phenolic resin/Carbon black | Carbon fiber nonwoven | None | 1700° C. |

-continued

| No. | Type | Top layers (⁴) | Middle layer (⁵) | Electron irradiation (¹¹) | Carbonization (⁹) |
|---|---|---|---|---|---|
| 4 | B | Ethylene-vinyl acetate copolymer (EVA) | Carbon fiber nonwoven | 150 Gy | 1750° C. |

The following table shows the physical properties of the exemplary embodiments compared to commercial reference materials based on established technology (Sigracet® GDL 29 AA and Sigracet® GDL 28 AA). It is found that, with a lesser thickness, the electrode materials according to the invention have properties comparable to those of the reference materials. The surface-specific resistance was measured according to DIN 51911-1997 and the flexural strength longitudinally and transversely according to ISO 5628-2019

| | Thickness (μm) | Thickness at 1 MPa load (pm) | Raw density (g/cm³) | Surface-specific stability* at 1 MPa surface pressure | Flexural strength longitudinal** (N mm) | Flexural strength transverse** (N mm) |
|---|---|---|---|---|---|---|
| Exemplary embodiment 1 | 160 | 130 | 0.30 | <3 | 1.9 | 1.3 |
| Exemplary embodiment 2 | 175 | 155 | 0.36 | <3 | 2.1 | 1.0 |
| Exemplary embodiment 3 | 160 | 115 | 0.21 | <6 | 1.2 | 0.8 |
| Exemplary embodiment 4 | 130 | 90 | 0.18 | <7 | 1.0 | 0.6 |
| Reference Sigracet® GDL 29 AA | 180 | 120 | 0.19 | <5 | 1.5 | 0.9 |
| Reference Sigracet® GDL 28 AA | 190 | 140 | 0.29 | <4 | 1.7 | 1.0 |

*DIN 51911
**ISO 5628

LIST OF REFERENCE SIGNS (1) Thermoplastic film
(2) Dispersion
(3) Roller
(4) Thermoplastic material with coating
(5) Coating
(6) Carbon fiber nonwoven
(7) Hot calendering machine or belt presses
(8) Hot calendering machine or belt presses
(9) Composite
(10) Furnace
(11) Electrode material
(12) Ionizing radiation or UV radiation

The invention claimed is:

1. A method for producing an electrode material for gas diffusion layers, comprising the following steps:
a) providing at least one layer of fibrous structure,
b) providing at least one layer of thermoplastic material,
c) stacking the at least one layer of fibrous structure from step a) with the at least one layer of thermoplastic material from step b),
d) joining the stacked layers of step c) by applying a pressure of 2 to 80 bar and a temperature of from 70 to 280° C. into a composite material, and
e) carbonizing the composite material from step d) at temperatures of from 1400 to 2500° C. in a protective gas atmosphere,
wherein the thermoplastic material of the at least one layer from step b) comprises at least one selected from the group consisting of polyethylene polypropylene, ethylene-vinyl acetate copolymers, polyvinyl butyral, cellulose acetate, polyvinyl alcohol, vinylpyrrolidone-vinyl acetate copolymers, styrene-maleic anhydride copolymers, and polyethylene.

2. The method according to claim 1, wherein the at least one layer of fibrous structure from step a) is a carbon fiber nonwoven or carbon fiber fabric.

3. The electrode material according to claim 2, wherein the electrode material has a thickness of 50 to 500 μm.

4. The method according to claim 1, wherein the at least one layer of fibrous structure from step a) has a thickness of from 50 to 400 μm.

5. The method according to claim 1, wherein the thermoplastic material of the at least one layer from step b) comprises at least one selected from the group consisting of polyethylene, polyvinyl butyral, of and cellulose acetate.

6. The method according to claim 1, wherein the at least one layer of the thermoplastic material from step b) is formed as a film or textile structure.

7. The method according to claim 6, wherein the at least one layer of the thermoplastic material has a thickness of 10 to 300 μm.

8. The method according to claim 7, wherein the at least one layer of the thermoplastic material is coated with carbonizable resins and/or carbon materials.

9. The method according to claim 8, wherein the carbonizable resins are selected from the group of phenolic resins, melamine resins, resorcinol-formaldehyde resins, phenol-modified hydrocarbon resins, benzoxazine resins, cyanate ester resins, vinyl ester resins, furan resins, polyimides, polyoxadiazole, or polyacrylonitriles.

10. The method according to claim 8, wherein the carbon materials are selected from the group of molasses, bitumen, coal tar pitch, graphite, carbon black, activated carbon, ground or cut carbon fibers or coke particles.

11. The method according to claim 8, wherein the at least one layer of the thermoplastic material is additionally coated with crosslinking additives.

12. The method according to claim 11, wherein the crosslinking additives are selected from the group of organic peroxides, dialdehydes, diamines or UV-crosslinking polymers.

13. The method according to claim 1, wherein in step d) the composite is additionally irradiated with ionizing radiation or UV radiation.

14. An electrode material produced according to claim 1.

15. A use of the electrode material according to claim 14 in polymer electrolyte fuel cells, in phosphoric acid fuel cells, microbial fuel cells, electrochemical reactors, oxygen consumption cathodes, metal-air batteries, PEM electrolyzers or batteries.

* * * * *